United States Patent
Elbaz et al.

(10) Patent No.: US 8,388,271 B2
(45) Date of Patent: Mar. 5, 2013

(54) CUTTING TOOL ASSEMBLY (75) Inventors: Moshe Elbaz, Nahariya (IL); Nader Farraj, Rama Village (IL); Yossi Abrahami, Karmiel (IL)

(73) Assignee: Iscar, Ltd., Tefen (IL)

( * ) Notice: Subject to any disclaimer, the term of this patent is extended or adjusted under 35 U.S.C. 154(b) by 336 days.

(21) Appl. No.: 12/938,944

(22) Filed: Nov. 3, 2010

(65) Prior Publication Data

US 2011/0110732 A1    May 12, 2011

(30) Foreign Application Priority Data

Nov. 10, 2009   (IL) .......................................... 202027

(51) Int. Cl.
B23B 29/04    (2006.01)
(52) U.S. Cl. ........................................ 407/101; 407/110
(58) Field of Classification Search .................... 407/66, 407/100, 101, 109, 110, 117; *B23B 29/04, B23B 29/12, 27/04*
See application file for complete search history.

(56) References Cited

U.S. PATENT DOCUMENTS

| | | | |
|---|---|---|---|
| 4,631,993 A * | 12/1986 | Kelm | ............................ 82/1.11 |
| 5,112,164 A | 5/1992 | Pano | |
| 5,288,180 A | 2/1994 | Hedlund | |
| 5,688,080 A * | 11/1997 | Hedlund | ........................ 407/101 |
| 6,186,704 B1 | 2/2001 | Hale | |
| 7,217,068 B2 * | 5/2007 | Oettle | ........................... 407/101 |
| 2004/0247404 A1 * | 12/2004 | Oettle | ........................... 407/117 |
| 2008/0003068 A1 | 1/2008 | Nagaya et al. | |
| 2009/0016830 A1 * | 1/2009 | Nicholas | ........................ 407/107 |

FOREIGN PATENT DOCUMENTS

JP    2009107071 A  *  5/2009

OTHER PUBLICATIONS

Machine translation of JP2009107071A.*
International Search Report in PCT/IL2010/000845, dated Feb. 18, 2011.

* cited by examiner

*Primary Examiner* — Daniel Howell
*Assistant Examiner* — Alan Snyder
(74) *Attorney, Agent, or Firm* — Womble Carlyle (57) ABSTRACT

A cutting tool assembly includes an exchangeable adapter releasably secured to a holder. The adapter is provided with a side plate. In a bottom view of the holder, a portion of a front surface of the holder adjacent a first side surface of the holder forms an internal acute angle α with the first holder side surface and in a bottom view of the adapter, a rear surface of the adapter side plate forms the acute angle α with an inner side surface of the adapter.

11 Claims, 8 Drawing Sheets

CUTTING TOOL ASSEMBLY

FIELD OF THE INVENTION

The present invention relates to a cutting tool assembly having an exchangeable adapter releasably secured to a holder and to which a cutting insert may be releasably clamped.

BACKGROUND OF THE INVENTION

Such metal cutting tool assemblies are well known, particularly in connection with parting, grooving and face turning operations.

U.S. Pat. No. 5,112,164 discloses a metal cutting tool assembly in which a planar adapter is fixed to a side surface of the holder at a distal end thereof by fixing screws. There is provided a clamping screw having a pressing portion to elastically move a first clamping jaw towards a second clamping jaw. The clamping jaws are formed integrally with the adapter and define between them an insert receiving slot for receiving a cutting insert. A neck portion serves to couple the first clamping jaw with the remainder of the adapter. The adapter is mounted by the fixing screws solely to one side surface of the holder, and screw insertion of the clamping screw into aligned screw receiving bores further clamps the adapter against the holder and exerts a resultant force on the first clamping jaw so as to pivot it about the neck portion of the adapter towards the second clamping jaw, thereby clamping the cutting insert between the clamping jaws.

U.S. Pat. Application No. 20080003068 discloses a head member mounted on a distal portion of a holder, having a first jaw and a second jaw opposing each other to constitute an insert mount seat clamping an insert. The head member is fixed by fixing screws to two receiving faces of the holder extending perpendicular to each other. A clamping screw is disposed in the distal portion of the holder and is inclined with respect to the extending direction of the insert mount seat. The holder is provided with a threaded hole engageable with the clamping screw, the first jaw is provided with a spot facing accommodating a pressing portion of the clamping screw, and a center axis of the spot facing and an axis of threaded hole obliquely intersect each other.

SUMMARY OF THE INVENTION

In accordance with the present invention there is provided a cutting tool assembly comprising a holder having:

a holder front surface;

opposing holder top and bottom surfaces and first and second holder side surfaces extending therebetween;

a recess, having a recess side surface, formed on the first holder side surface and extending rearwardly from the holder front surface, and a recess top surface adjacent the recess side surface and formed on the holder top surface.

The cutting tool assembly further contains an adapter removably secured to the holder, the adapter including:

an insert clamping portion;

opposing adapter top and bottom surfaces, and adapter inner and outer side surfaces extending therebetween; and an adapter side plate protruding transversely from the adapter inner side surface, the adapter side plate having an adapter side plate rear surface adjacent the adapter inner side surface.

In accordance with embodiments of the present invention, the adapter inner side surface abuts the recess side surface, and the adapter side plate rear surface abuts the holder front surface at a holder front surface portion that is adjacent to the first holder side surface.

In accordance with embodiments of the present invention, in a bottom view of the holder, the holder front surface portion forms an internal acute angle α with the first holder side surface and in a bottom view of the adapter, the adapter side plate rear surface forms the acute angle α with the adapter inner side surface.

In accordance with some embodiments, fixing screw threaded bores are located on the recess side surface and on the portion of the holder front surface adjacent the first holder side surface and fixing screw receiving bores are located on the adapter side surfaces and on a front surface of the side plate. A clamping screw threaded bore is located on the recess top surface and a clamping screw receiving bore is located on the adapter top surface.

In accordance with some embodiments, the clamping screw threaded bore is inclined at an acute angle β with respect to a line perpendicular to the adapter top surface.

In accordance with some embodiments, the adapter top surface forms the top surface of an adapter top plate which protrudes transversely from the adapter inner side surface.

In accordance with some embodiments, the adapter bottom surface abuts a base surface of the recess.

In accordance with some embodiments, the base surface of the recess comprises two abutment surfaces, and the adapter bottom surface abuts the two abutment surfaces.

In accordance with some embodiments, the clamping portion of the adapter comprises upper and lower clamping jaws defining between them an insert pocket in which a cutting insert is retained.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE PRESENT INVENTION

Figure 1:
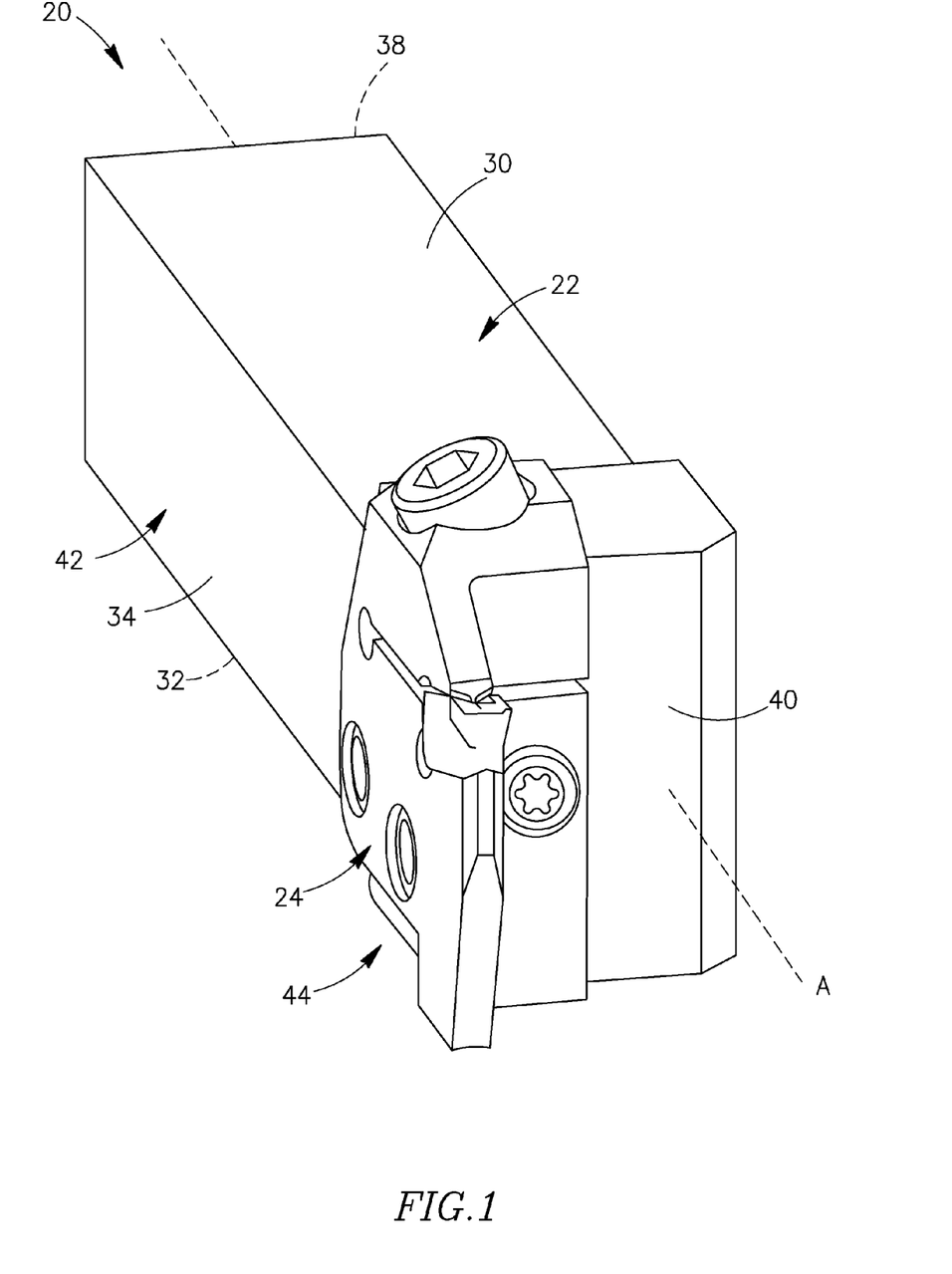
FIG. 1 is a perspective view of a cutting tool assembly showing a first side surface of a holder according to the present invention.
Figure 2:
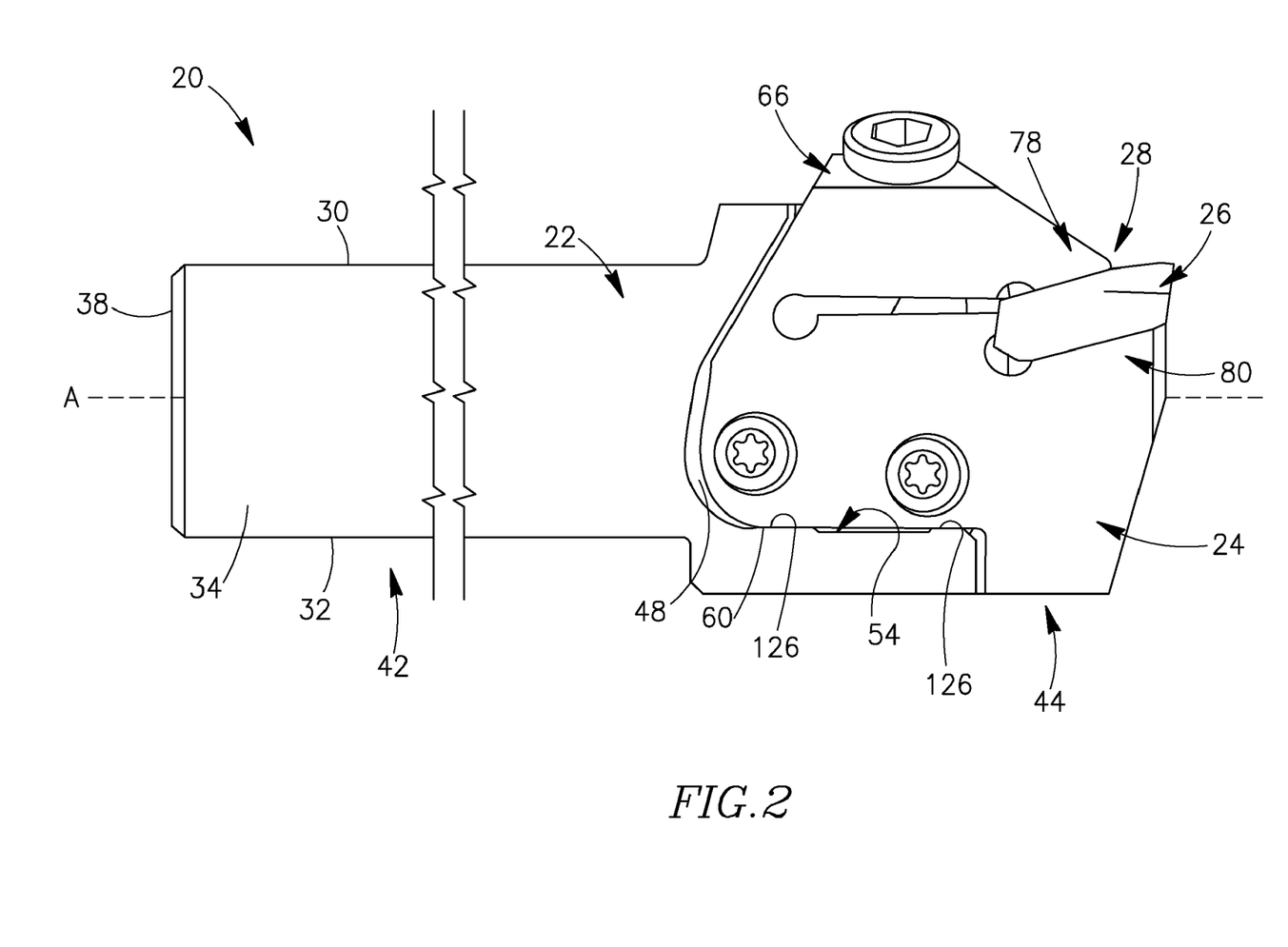
FIG. 2 is a side view of the cutting tool assembly shown in FIG. 1.
Figure 3:
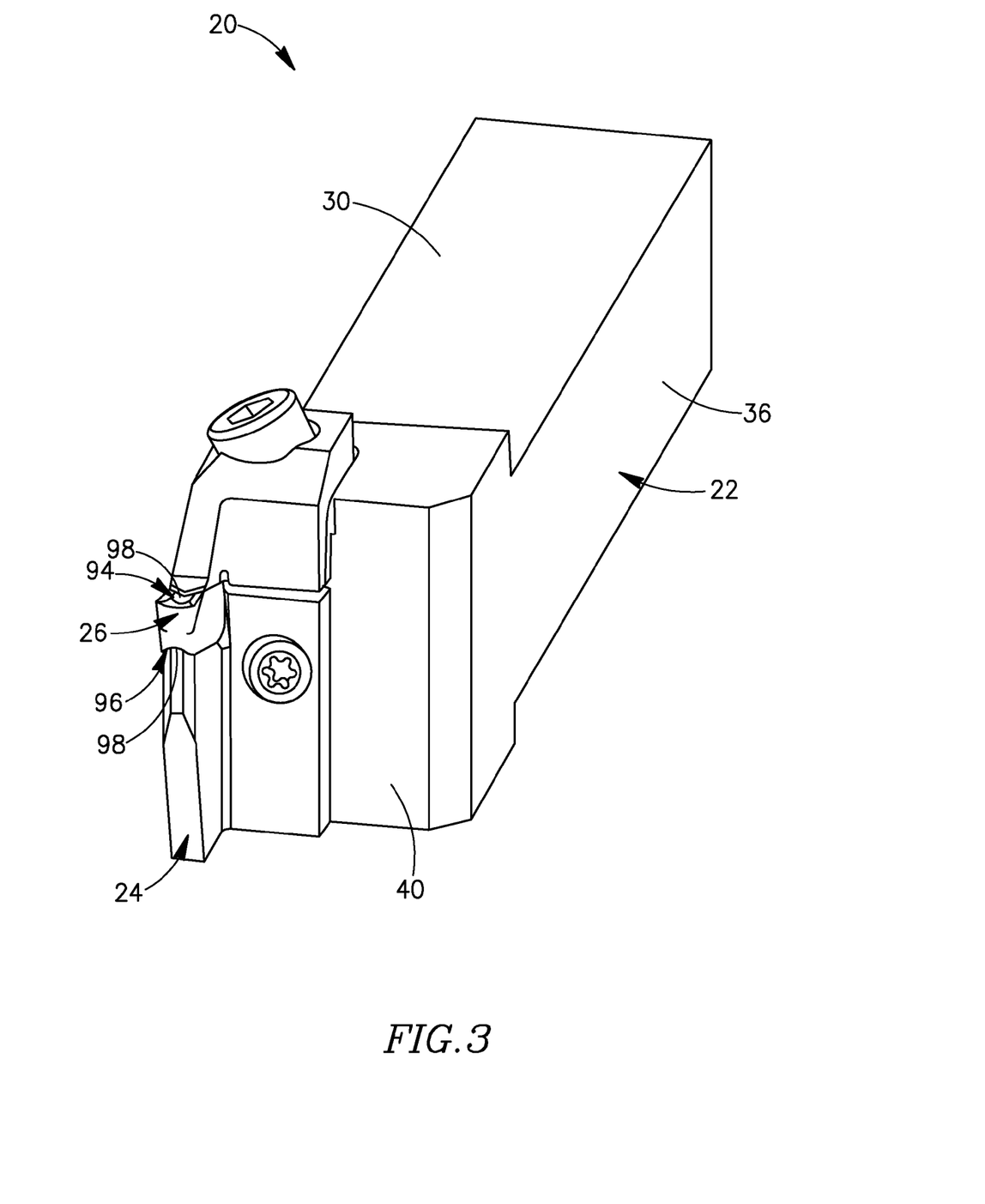
FIG. 3 is a perspective view of the cutting tool assembly shown in FIG. 1 showing a second side surface of the holder.

Attention is drawn to FIGS. 1 to 3, showing a cutting tool assembly 20 in accordance with the present invention. The cutting tool assembly 20 may be used for metal cutting operations such as parting, grooving and face turning operations. The cutting tool assembly 20 includes a holder 22 having a longitudinal axis A and a substantially quadrangular column shape, and an adapter 24 removably secured to the holder 22 for releasably retaining a cutting insert 26 in a clamping portion 28 of the adapter 24. The holder 22 has opposing, generally parallel, holder top and bottom surfaces 30, 32 and holder first and second side surfaces 34, 36 extending therebetween. Opposing holder rear and front surfaces 38, 40 extend between the holder first and second side surfaces 34, 36. The holder 22 includes a shank portion 42 adjacent the holder rear surface 38 and a mounting portion 44 adjacent the holder front surface 40.

Figures 4, 5:
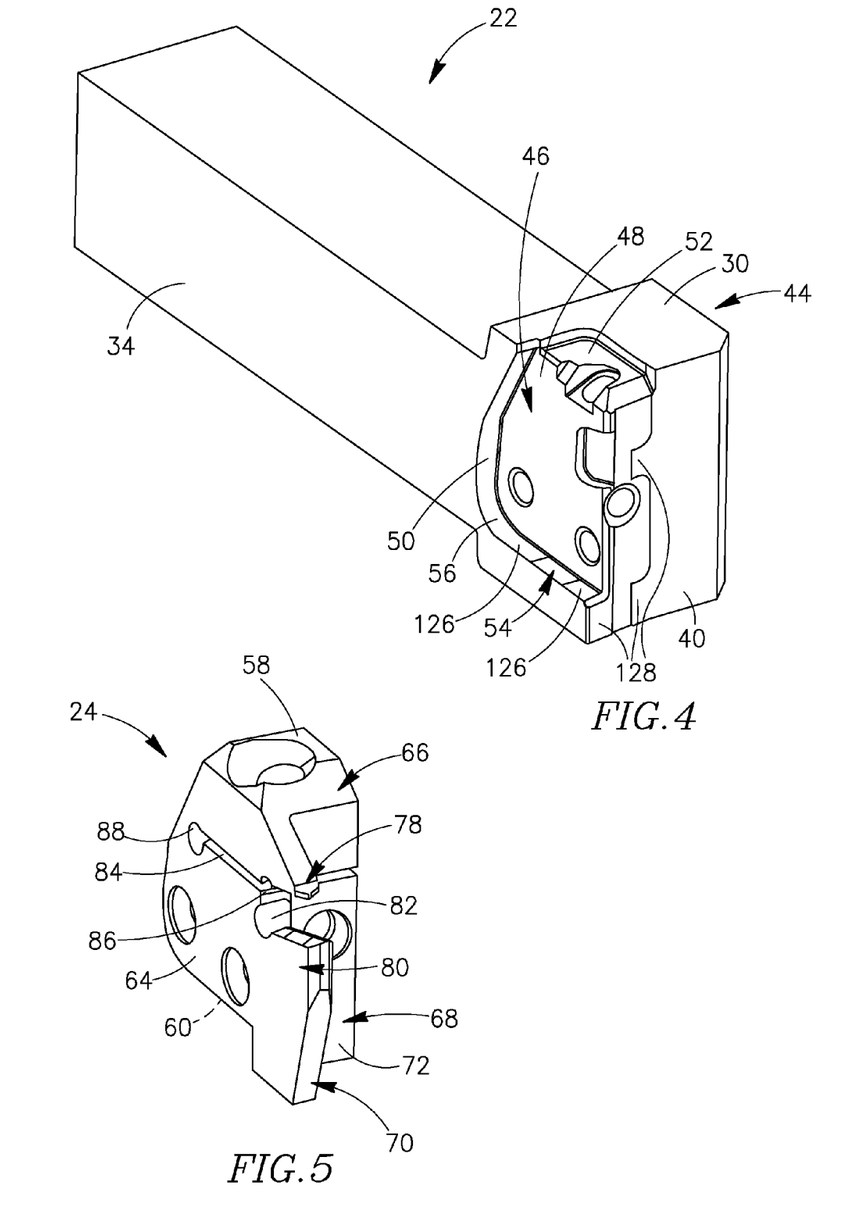
FIG. 4 is a perspective view of the holder according to the present invention.
FIG. 5 is a perspective view of an adapter taken from an outer side surface of the adapter according to the present invention.

Attention is now drawn to FIG. 4. The holder 22 contains a recess 46 formed on the holder first side surface 34 on the mounting portion 44 and extending rearwardly from the holder front surface 40. The recess 46 has a recess side surface 48 extending rearwardly from the holder front surface 40 to a recess rear surface 50 along the holder first side surface 48. A recess top surface 52 is formed on the holder top surface 30 adjacent and perpendicular to the recess side surface 48. The recess top surface 52 is parallel to a recess base surface 54. The recess base surface 54 extends from the recess side surface 48 to the holder first side surface 34. The recess rear surface 50 is curved and is connected to the recess base surface 54 via an arcuate surface 56.

Figure 6:
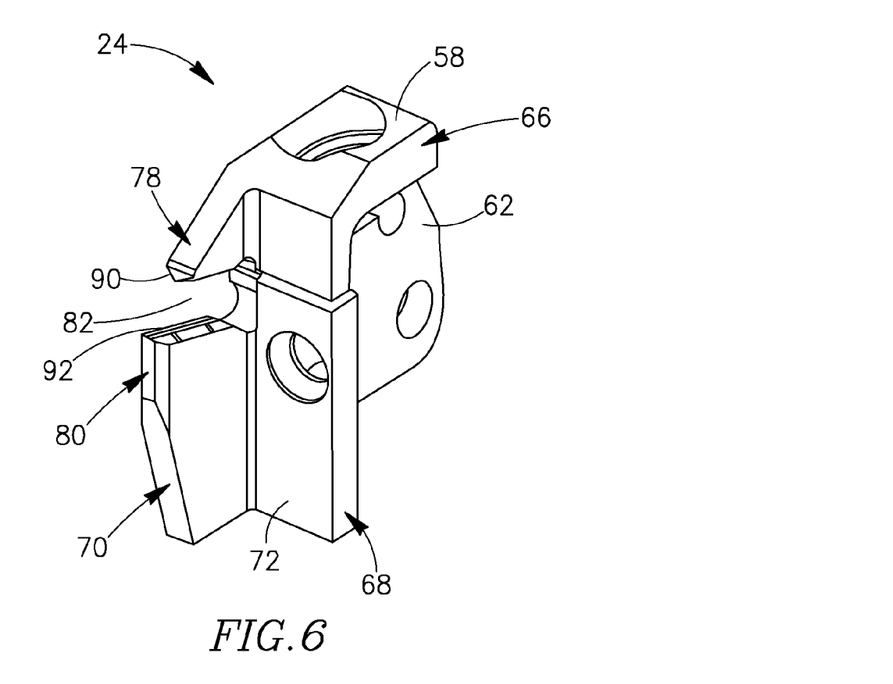
FIG. 6 is a perspective view of the adapter shown in FIG. 5 taken from an inner side surface of the adapter.
Figure 7:
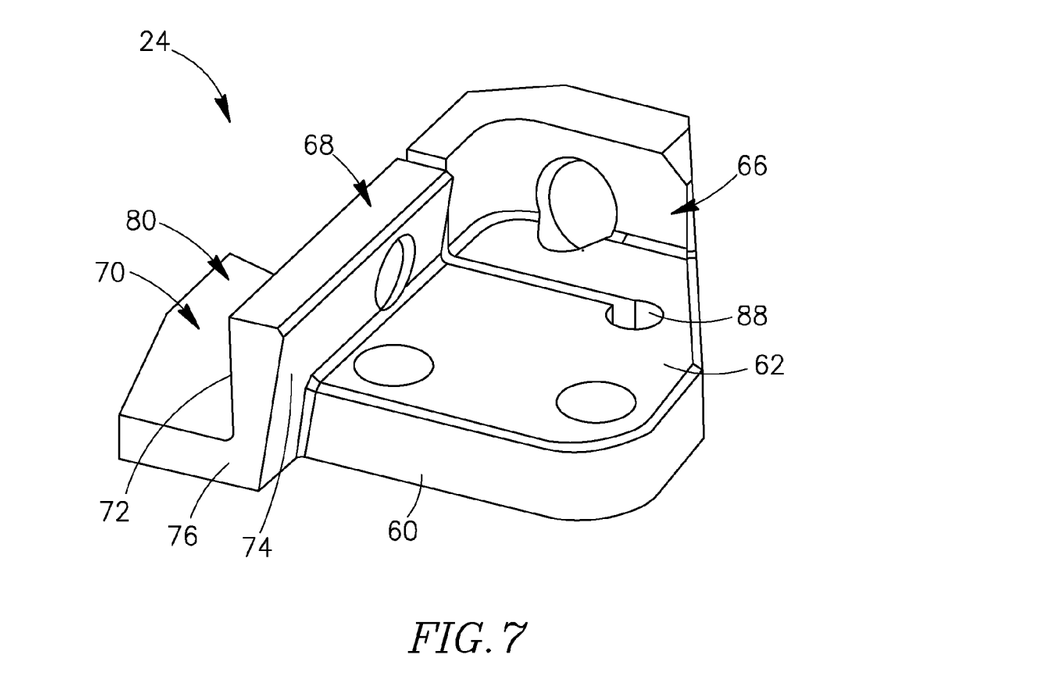
FIG. 7 is a bottom side view of the adapter shown in FIG. 5.

Attention is now drawn to FIGS. 5 to 7. The adapter 24 has opposing adapter top and bottom surfaces 58, 60, and adapter inner and outer side surfaces 62, 64. The adapter top surface 58 also forms the top surface of an adapter top plate 66 which protrudes transversely from the adapter inner side surface 62. The adapter 24 has an adapter side plate 68 which protrudes transversely from the adapter inner side surface 62 and from the adapter top surface 58, and an adapter front plate 70 which protrudes forwardly and transversely from the adapter side plate 68. The adapter side plate 68 has an adapter side plate front surface 72 adjacent the adapter front plate 70 and an adapter side plate rear surface 74 adjacent the adapter inner side surface 62. A bottom part 76 of the adapter side plate 68 extends beyond the adapter bottom surface 60.

The clamping portion 28 of the adapter 24 includes opposing upper and lower clamping jaws 78, 80 defining between them an insert pocket 82 in which the cutting insert 26 is retained. The lower clamping jaw 80 is formed as an upper portion of the adapter front plate 70 and the upper clamping jaw 78 extends forwardly from the adapter side and top plates 70, 66. A narrow slit 84 extends rearwardly through the adapter 24 from a rear end 86 of the insert pocket 82 to a connection portion 88. The connection portion 88 joins between the upper and lower jaws 78, 80 which are formed integrally as part of the adapter 24. The connection portion 88 serves to resiliently couple the upper and lower clamping jaws 78, 80. In accordance with some embodiments, the upper clamping jaw 78 has the form of a V-shaped projection 90 projecting downwards, and the lower clamping jaw 80 has the form of a V-shaped projection 92 projecting upward, to accommodate firmly the cutting insert 26. The cutting insert 26 has a complementary shape with top and bottom surfaces 94, 96 having the form of V-shaped recesses 98, to accommodate and abut the V-shaped projections 90, 92 of the clamping jaws 78, 80.

Figure 8:
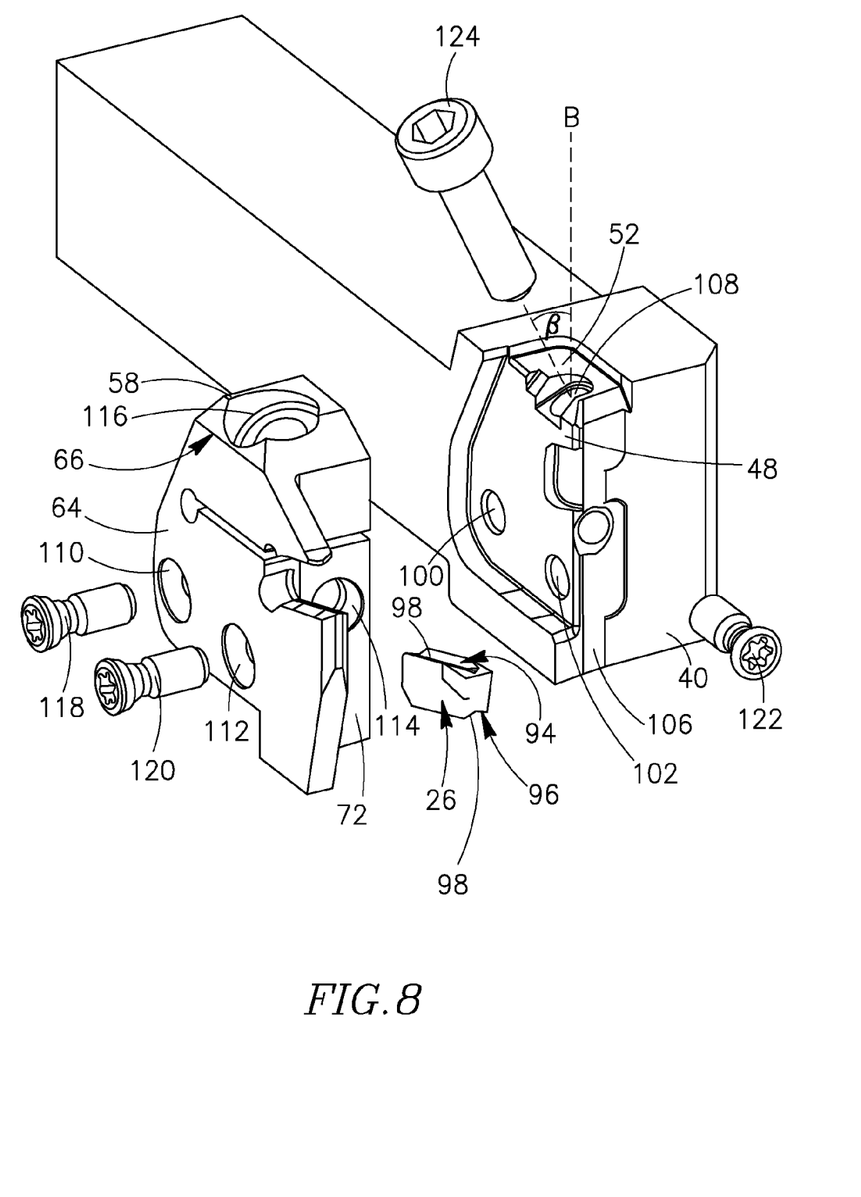
FIG. 8 is an exploded view of the cutting tool assembly shown in FIG. 1.

Attention is drawn to FIG. 8. Fixing and clamping screw threaded and unthreaded receiving bores are formed respectively in the holder 22 and the adapter 24 to receive fixing screws and a clamping screw respectively. First and second fixing screw threaded bores 100, 102 are located on the recess side surface 48 and extend transversely thereinto. A third fixing screw threaded bore 104 is located on the holder front surface 40 and extends transversely thereinto. More specifically, the third fixing screw threaded bore 104 is located on a holder front surface portion 106 that is adjacent the holder first side surface 34. A clamping screw threaded bore 108 is located on the recess top surface 52 and is inclined at an acute angle β with respect to a line B perpendicular to the recess top surface 52 in a plane perpendicular to the holder longitudinal axis A. The angle β is preferably in the range from about 5° to 45°, and more preferably about 25°. First and second fixing screw receiving bores 110, 112 are located on the adapter side surfaces 62, 64, extending transversely from the adapter outer side surface 64 to the adapter inner side surface 62. A third fixing screw receiving bore 114 is located on and extends transversely from the adapter side plate front surface 72 to the adapter side plate rear surface 74. A clamping screw receiving bore 116 is located on and extends from the adapter top surface 58 through the adapter top plate 66.

The adapter 24 is secured to the holder 22 by means of fixing screws 118, 120, 122 and a clamping screw 124. The first and second fixing screws 118, 120 are threadingly engaged into the first and second fixing screw threaded bores 100, 102 via the first and second fixing screw receiving bores 110, 112, and the third fixing screw 122 is threadingly engaged into the third fixing screw threaded bore 104 via the fixing screw receiving bore 114. The clamping screw 124 is threadingly engaged into the clamping screw threaded bore 108 via the clamping screw receiving bore 116. This construction increases the rigidity of the fixation of the adapter 24 to the holder 22, in comparison with the prior art.

Figure 9:
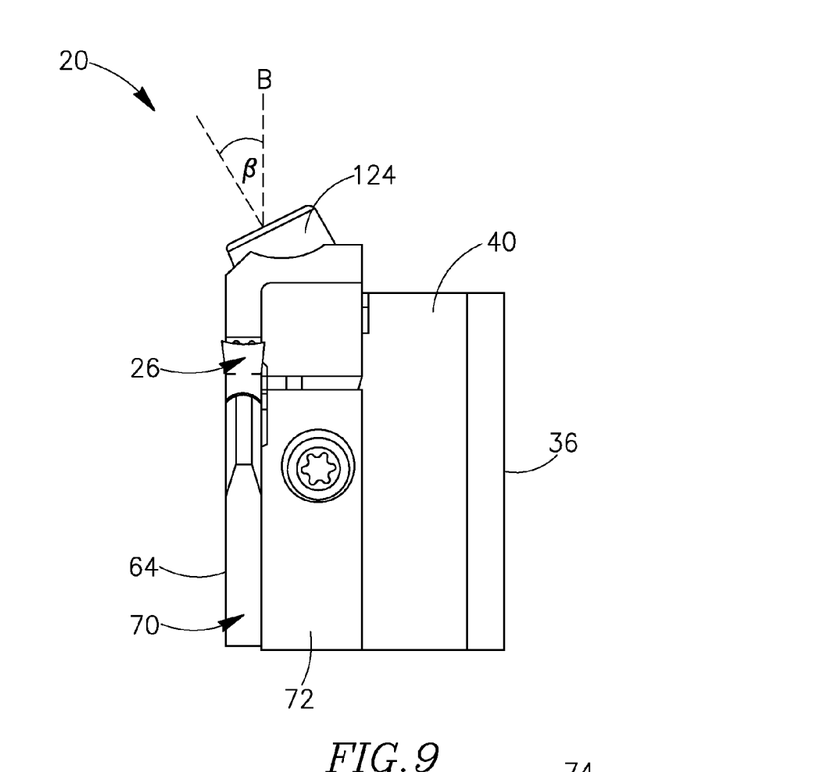
FIG. 9 is a front view of the cutting tool assembly shown in FIG. 1.

As can be seen in FIG. 9, the clamping screw 124 is inclined at the same acute angle β as the clamping screw threaded bore 108 with respect to the line B perpendicular to the recess top surface 52 in a plane perpendicular to the holder longitudinal axis A. The effect of the clamping screw 124 is to exert a downwardly directed pivoting force on the upper clamping jaw 78 about the connection portion 88 into firmly clamping the cutting insert 26 against the lower clamping jaw 80. Another effect of the clamping screw 124 is to reinforce the fixation of the adapter 24 to the holder 22, by clamping the adapter outer side surface 64 against the recess side surface 48, and the adapter bottom surface 60 against the recess base surface 54.

Figure 10:
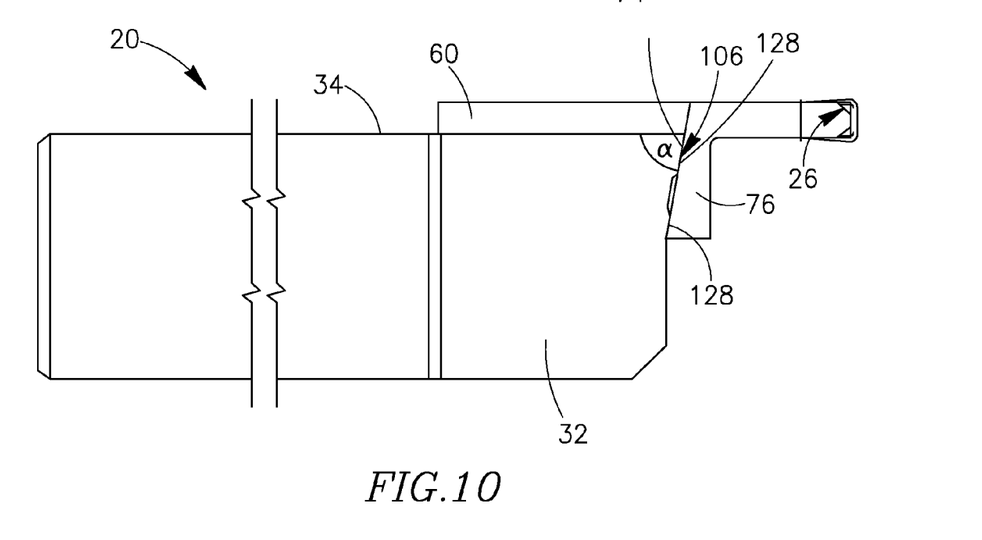
FIG. 10 is a bottom view of the cutting tool assembly shown in FIG. 1.

When the adapter 24 is retained in the holder 22 (shown, e.g., in FIGS. 2 and 10), the adapter inner side surface 62 abuts the recess side surface 48, the adapter side plate rear surface 74 abuts the holder front surface portion 106 adjacent the holder first side surface 34, and the adapter bottom surface 60 abuts the recess base surface 54. The adapter top plate 66 does not abut the recess top surface 52. In accordance with some embodiments, the recess base surface 54 has two abutment surfaces 126 which abut the adapter bottom surface 60. The holder front surface portion 106 adjacent the holder first side surface 34 may have three abutment surfaces 128 that abut the adapter side plate rear surface 74, two at a bottom part of the holder front surface portion 106 and one at an upper part of the holder front surface portion 106, adjacent the fixing screw threaded bore 104.

Figure 11:
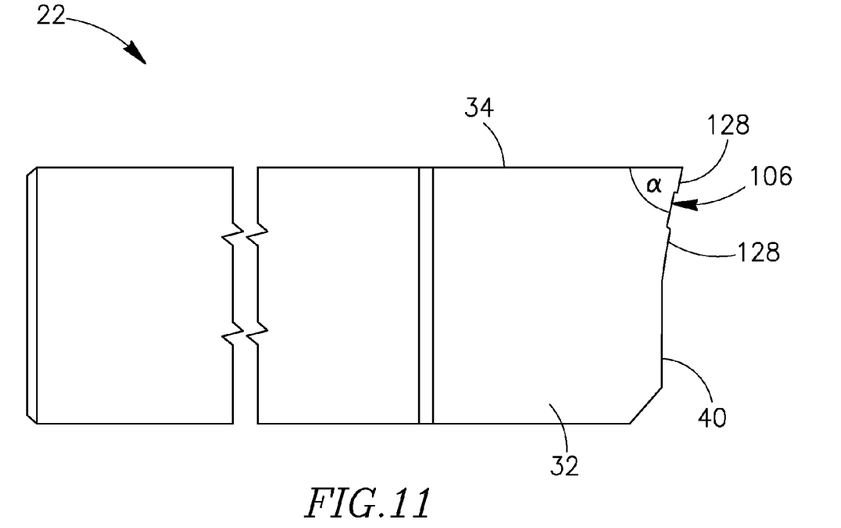
FIG. 11 is a bottom view of the holder shown in FIG. 4.

As can be seen in a bottom view of the holder 22 in FIG. 11, the holder front surface portion 106 adjacent the holder first side surface 34 forms an internal acute angle α with the holder first side surface 34. As can be seen in a bottom view of the adapter 24 in FIG. 12, the adapter side plate rear surface 74 forms the acute angle α with the adapter inner side surface 62. The angle α is preferably in the range from about 60° to 85°, and more preferably about 80°. When the adapter 24 is retained in the holder 22, the mutual inclination of the holder front surface portion 106 adjacent the holder first side surface 34 and the adapter side plate front surface 74 provides secure retention and stable coupling between the adapter 24 and the holder 22 against transverse cutting forces acting on the adapter 24 via the cutting insert 26.

Figure 12:
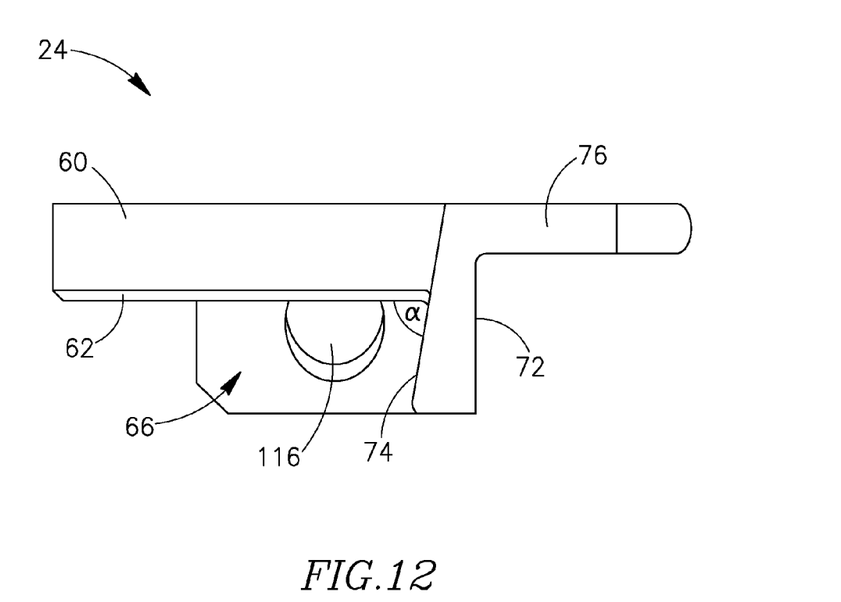
FIG. 12 is a bottom view of adapter shown in FIG. 5.

By virtue of the mutual inclination of the holder front surface portion 106 adjacent the holder first side surface 34 and the adapter side plate front surface 74, several advantages are provided. It decreases the stresses applied on the adapter 24 during machining. Furthermore, only one fixing screw 122 is required to secure the adapter side plate 68 to the holder front surface 40, in contrast with the aforementioned U.S. Pat. Application No. 20080003068, where two fixing screws are required. The result is shorter production time and a smaller set up time.

Although the present invention has been described to a certain degree of particularity, it should be understood that various alterations and modifications could be made without departing from the spirit or scope of the invention as hereinafter claimed.

What is claimed is:

1. A cutting tool assembly (20) comprising:
   a holder (22) comprising:
      a holder front surface (40);
      opposing holder top and bottom surfaces (30, 32) and first and second holder side surfaces (34, 36) extending therebetween; and
      a recess (46), having a recess side surface (48), formed on the first holder side surface (34) and extending rearwardly from the holder front surface (40), and a recess top surface (52) adjacent the recess side surface (48) and formed on the holder top surface (30); and
   an adapter (24) removably secured to the holder (22), the adapter (24) comprising:
      an insert clamping portion (28);
      opposing adapter top and bottom surfaces (58, 60), and adapter inner and outer side surfaces (62, 64) extending therebetween; and
      an adapter side plate (68) protruding transversely from the adapter inner side surface (62), the adapter side plate (68) having an adapter side plate rear surface (74) adjacent the adapter inner side surface (62) and an adapter side plate front surface (72); wherein:
   the adapter inner side surface (62) abuts the recess side surface (48);
   the adapter side plate rear surface (74) abuts the holder front surface (40) at a holder front surface portion (106) that is adjacent to the first holder side surface (34);
   in a bottom view of the holder (22), the holder front surface portion (106) forms an internal acute angle α with the first holder side surface (34); and
   in a bottom view of the adapter (24), the adapter side plate rear surface (74) forms the acute angle α with the adapter inner side surface (62).

2. The cutting tool assembly (20) according to claim 1, wherein:
   fixing screw threaded bores (100, 102, 104) are located on the recess side surface (48) and on the holder front surface portion (106);
   fixing screw receiving bores (110, 112, 114) are located on the adapter side surfaces (62, 64) and on the adapter side plate front surface (72);
   a clamping screw threaded bore (108) is located on the recess top surface (52); and
   a clamping screw receiving bore (116) is located on the adapter top surface (58).

3. The cutting tool assembly (20) according to claim 2, wherein the clamping screw threaded bore (108) is inclined at an acute angle β with respect to a line (B) perpendicular to the adapter top surface (58).

4. The cutting tool assembly (20) according to claim 1, wherein the adapter top surface (58) forms the top surface of an adapter top plate (66) which protrudes transversely from the adapter inner side surface (62).

5. The cutting tool assembly (20) according to claim 1, wherein the adapter bottom surface (60) abuts a base surface (54) of the recess (46).

6. The cutting tool assembly (20) according to claim 5, wherein:
   the base surface (54) of the recess (46) comprises two abutment surfaces (126); and
   the adapter bottom surface (60) abuts the two abutment surfaces (126) of the base surface (54) of the recess (46).

7. The cutting tool assembly (20) according to claim 1, wherein the clamping portion (28) of the adapter (24) comprises upper and lower clamping jaws (78, 80) defining between them an insert pocket (82) in which a cutting insert (26) is retained.

8. The cutting tool assembly (20) according to claim 1, wherein:
   the holder front surface portion (106) has three abutment surfaces (128);
   the adapter side plate rear surface (74) abuts the three abutment surfaces (128) of the holder front surface portion (106).

9. The cutting tool assembly (20) according to claim 8, wherein:
   the three abutment surfaces (128) of the holder front surface portion (106) include two abutment surfaces at a bottom part of the holder front surface portion (106) and one abutment surface at an upper part of the holder front surface portion (106).

10. The cutting tool assembly (20) according to claim 1, wherein the holder front surface (40) has only a single fixing screw threaded bore (104).

11. The cutting tool assembly (20) according to claim 1, wherein the acute angle α is in the range from about 60° to 85°.

* * * * *